United States Patent [19]

van der Lely

[11] Patent Number: 4,508,179

[45] Date of Patent: Apr. 2, 1985

[54] SOIL CULTIVATING IMPLEMENTS

[76] Inventor: Cornelis van der Lely, 7 Brüschenrain, Zug, Switzerland

[21] Appl. No.: 503,019

[22] Filed: Jun. 10, 1983

[30] Foreign Application Priority Data

Jun. 11, 1982 [NL] Netherlands ............. 8202359

[51] Int. Cl.³ ............................................. A01B 33/08
[52] U.S. Cl. ................... 172/49.5; 172/125; 74/423; 74/606 R
[58] Field of Search ............ 172/49.5, 59, 125, 111, 172/54.5; 74/606 R, 417, 423, 665 GB, 665 GC

[56] References Cited

U.S. PATENT DOCUMENTS

| | | | | |
|---|---|---|---|---|
| 2,454,868 | 11/1948 | Gibson | | 74/423 X |
| 2,582,364 | 1/1952 | Tice | | 172/59 |
| 3,616,862 | 11/1971 | Lely | | 172/49.5 |
| 3,713,494 | 1/1973 | Berdrin | | 172/125 |
| 3,730,802 | 5/1973 | Stewart | | 156/293 |
| 4,003,437 | 1/1977 | Lely | | 172/59 |
| 4,029,153 | 6/1977 | Lely | | 172/125 |
| 4,050,519 | 9/1977 | Lely | | 172/54.5 |
| 4,098,345 | 7/1978 | Lely | | 172/125 |
| 4,300,639 | 11/1981 | Lely | | 172/49.5 |

FOREIGN PATENT DOCUMENTS

| | | | |
|---|---|---|---|
| 6908692 | 11/1970 | France | 172/49.5 |
| 1547718 | 6/1979 | United Kingdom | 172/125 |

Primary Examiner—Richard J. Johnson
Attorney, Agent, or Firm—Penrose Lucas Albright

[57] ABSTRACT

In a soil cultivating implement of the kind which comprises a row of rotary power-driven soil working members which extend substantially horizontally and perpendicular to the implement's intended direction of operative travel, the cost of making and assembling the implement is reduced by providing a drive transmission to the soil working members which includes an upright shaft fixed in a sleeve of an open-bottomed gearbox. A bevel pinion is rotatable around the lower end of such fixed shaft and is fastened by adhesively secured pins to the top of one of the spur pinions, each of which is welded to the upper end of a rotary shaft carrying the corresponding soil working member. Blades are provided adjacent the bevel pinion and nearby spur pinions to distribute lubricant to such pinions. One lifts lubricant to the intermeshing spur pinions and another blade further guides same to the bevel pinion.

21 Claims, 4 Drawing Figures

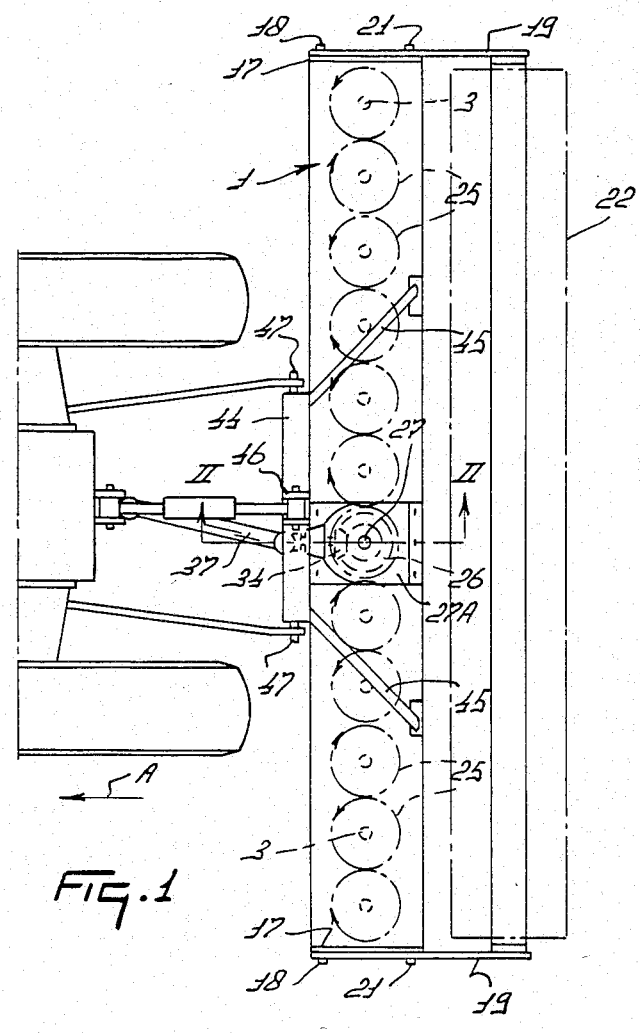
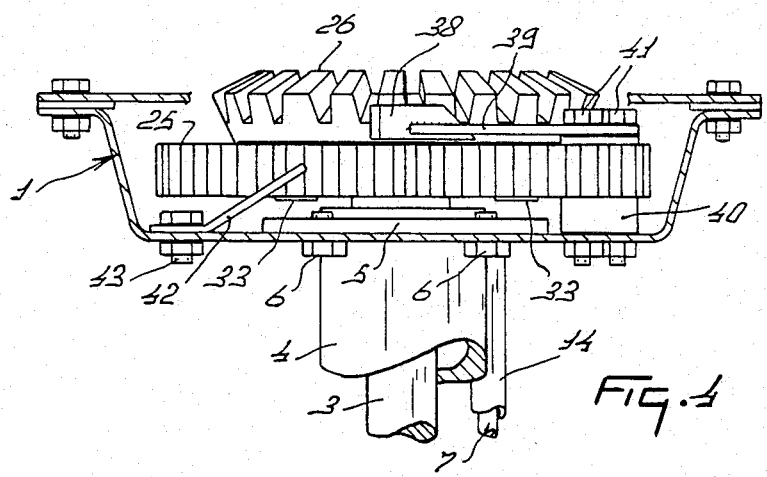
Fig. 1
Fig. 4

SOIL CULTIVATING IMPLEMENTS

SUMMARY OF THE INVENTION

This invention relates to soil cultivating implements or machines of the kind comprising a plurality of soil working members arranged in a row that extend in a direction which is substantially horizontally perpendicular, or at least transverse, to the intended direction of operative travel of the implement or machine, the soil working members being power-drivable, to rotate about corresponding substantially vertical, or at least upwardly extending, axes during the use of the implement or machine by a transmission comprising intermeshing toothed pinions. The term "implement or machine" is shortened to "implement" throughout the remainder of this document for the brevity.

An object of the invention is to enable an implement of this kind to be manufactured and assembled at less cost than heretofore and, in one of its aspects, the invention accordingly provides a soil cultivating implement of the kind set forth, wherein one of the toothed pinions is a bevel pinion or crown wheel arranged to revolve around a fixed and upwardly extending shaft.

BRIEF DESCRIPTION OF THE DRAWINGS

For a better understanding of the invention, and to show how the same may be carried into effect, reference will now be made, by way of example, to the accompanying drawings, in which:

FIG. 1 is a plan view of a soil cultivating implement in accordance with the invention shown connected to the rear of an agricultural tractor, FIG. 4 is a section taken on the line IV—IV in FIG. 3.

DESCRIPTION OF THE PREFERRED EMBODIMENT

Figure 2:
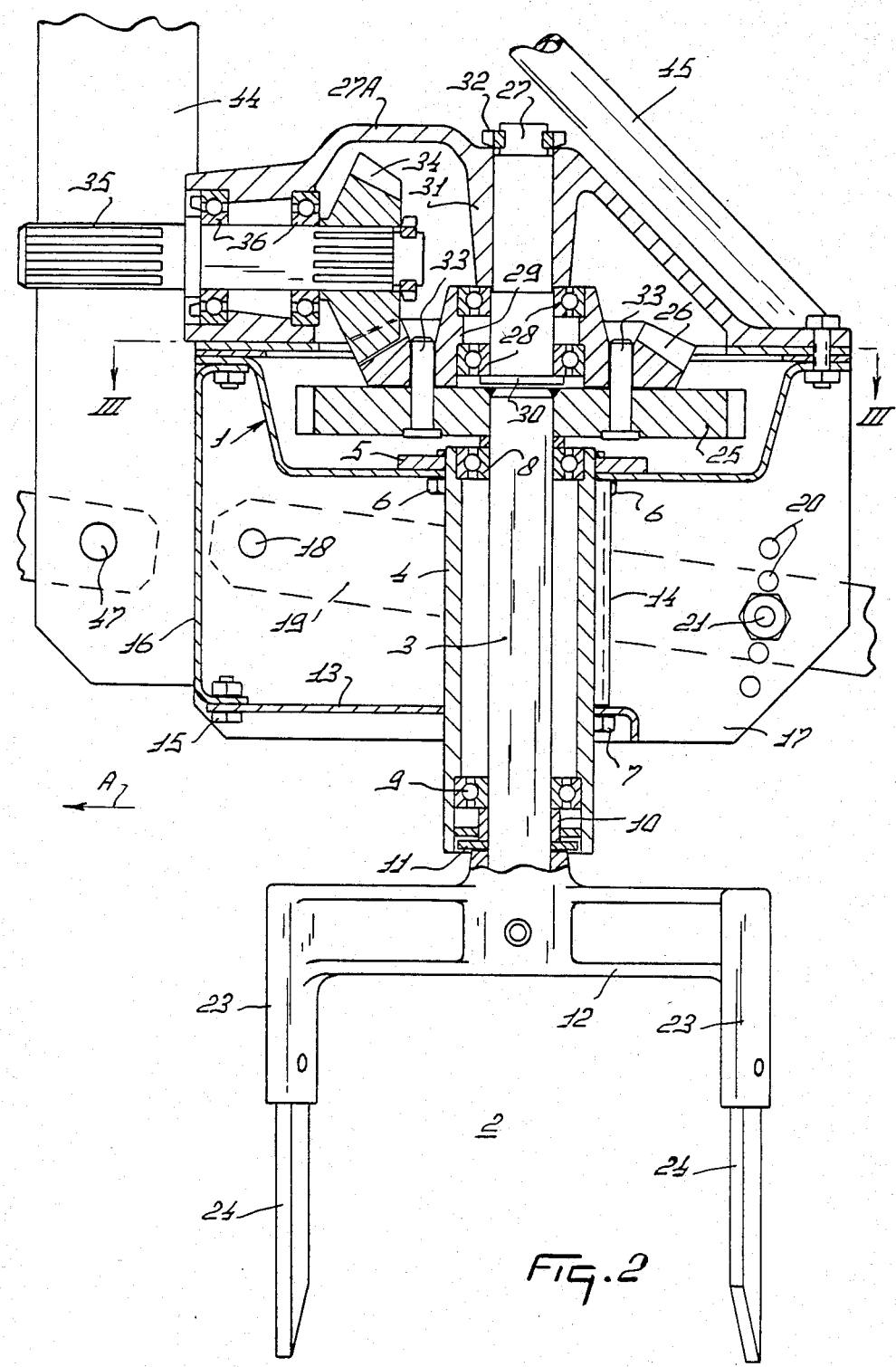
FIG. 2 is a partial section, to an enlarged scale, taken on the line II—II in FIG. 1.
Figure 3:
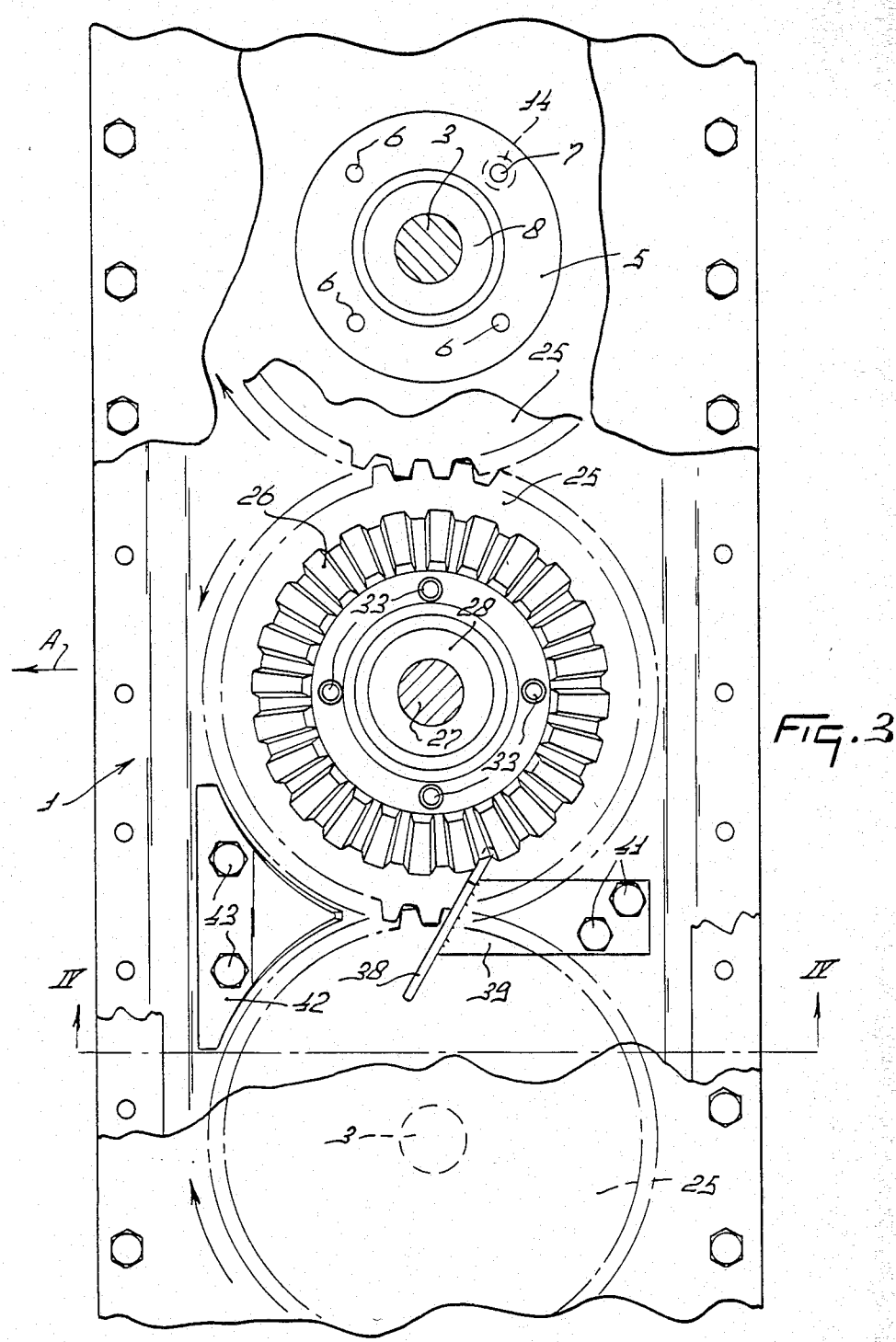
FIG. 3 is a section taken on the line III—III in FIG. 2.

Referring to the accompanying drawings, the soil cultivating implement that is illustrated therein is in the form of a rotary harrow which harrow has a hollow frame portion that extends substantially horizontally transverse, and usually (as illustrated) substantially horizontally perpendicular, to the intended direction of operative travel of the harrow that is indicated by an arrow A in FIGS. 1, 2 and 3 of the drawings. The hollow frame portion 1 is made from sheet steel and comprises a lower portion of channel-shaped cross section (see FIGS. 2 and 4 of the drawings) having limbs that diverge upwardly away from the substantially horizontally disposed bottom thereof. The upper edges of the upwardly divergent limbs are bent-over substantially horizontally in opposite outwardly extending directions and a flat cover plate is secured to those bent-over edges or rims by a plurality of substantially regularly spaced apart and substantially vertically disposed small bolts (see FIG. 3), a gasket being interposed between the edges or rims of the lower part of the hollow frame portion 1 and the top cover plate thereof to prevent the leakage of oil or other lubricant and the ingress of abrasive dirt. Approximately midway between its front and rear, considered in the direction A, the hollow elongate frame portion 1 supports a row of underlying rotary soil working members 2 of which, in the example that is being described, there are twelve. The axis of rotation of each soil working member 2 coincides with the longitudinal axis of a corresponding vertically or substantially vertically disposed shaft 3, these axes of rotation conveniently, but not essentially, being spaced apart from one another at intervals of twenty-five centimeters so that, with this spacing, the implement that is being described has a working width of substantially three meters, the strips of soil that are worked by the individual members 2 overlapping one another to some extent since each member 2 has an effective working width which is a little greater than is the spacing between the longitudinal axes of neighboring shafts 3.

Each shaft 3 is surrounded throughout a central and major part of its length by a corresponding tube 4 having an internal diameter which is considerably greater than the diameter of the shaft 3 concerned. The upper end of each tube 4 is entered upwardly through a hole provided in the substantially flat bottom of the lower part of the hollow frame portion 1, said upper end having a corresponding flange 5 welded to it and said flange 5 being securely but releasably fastened against the inner surface of the frame portion bottom by a plurality, such as four, of bolts 6 and 7 (see FIG. 3) that are spaced apart from one another at substantially regular intervals around the axis of the corresponding shaft 3. Each shaft 3 has a constant diameter throughout substantially the whole of its length and projects both upwardly beyond the upper end of the corresponding tube 4 and downwardly below the lower end of that tube. The upper end of each tube 4 is internally stepped and the step receives the outer race of a corresponding ball bearing 8, whose inner race of which immediately surrounds the shaft 3 concerned. A similar arrangement exists at the lower end of each tube 4 except that, at this location, the internal step of the tube 4 extends farther inwardly of that tube than does the step at the upper end thereof, the step at the lower end receiving the outer race of a ball bearing 9, the inner race of which again immediately surrounds the shaft 3 concerned. A spacing sleeve 10 surrounds each shaft 3 between the inner race of the corresponding lower ball bearing 9 and the upper surface of a washer 11 which has its lower surface bearing against the upper end of the hub of a carrier 12 forming part of the corresponding soil working member 2. An oil sealing ring also surrounds each spacing sleeve 10 between the washer 11 and the lower ball bearing 9, the latter being recessed some distance upwardly into the tube 4 due to the vertical extent of the internal step of that tube at its lower end. The hub of each soil working member carrier 12 is firmly but releasably secured to the downwardly projecting end of the shaft 3 which it surrounds by way of a transverse clamping pin which may be of a construction that is known per se.

Each tube 4 is entered, at a location a short distance beneath its mid-point, through a hole in a horizontally or substantially horizontally disposed plate 13 which plate 13 is parallel or substantially parallel to the bottom of the hollow frame portion 1. Each tube 4 projects downwardly beyond the plate 13 by a distance which is equal or substantially equal to its own external diameter. The rear edge of the plate 13, which lies just behind the tubes 4, with respect to the direction A, is bent-over so as to extend substantially perpendicularly downwards. Three relatively short bolts 6 and one much longer bolt 7 correspond to each tube 4 and flange 5 and it will be seen from FIGS. 2, 3 and 4 of the drawings that each long bolt 7 has its shank surrounded by a spacing sleeve 14, the bolts 7 serving to assist in clamping the flanges 5 in position and to connect said flanges 5 positively to the plate 13. The leading unbent edge of the plate 13, relative to the direction A, is secured by a number of small substantially vertically disposed bolts 15 to the lower and rearwardly bent-over edge of a leading substantially vertically disposed plate 16. As can be seen in FIG. 2 of the drawings, the upper edge of the substantially vertically disposed plate 16 is bent-over rearwardly and is secured to the leading rim of the hollow frame portion 1 by the same type of small and substantially vertically disposed bolts as connect the upper and lower parts of that frame portion to one another. The plates 13 and 16 extend throughout substantially the whole of the transverse length of the hollow frame portion 1.

The opposite ends of the hollow frame portion 1 are closed by parallel and substantially vertically disposed side plates 17 that are of generally, but not exactly, rectangular configuration (see FIG. 2), each side plate 17 having its upper edge at substantially the same level as the cover plate of the frame portion 1, its leading edge at the same portion of advance, with respect to the direction A, as the plate 16, its rearmost edge in register with the rear rim of the frame portion 1 and its lowermost edge well below the bottom of that frame portion at the level of the extremity of the downwardly bent-over rear edge of the substantially horizontal plate 13, each side plate 17 being fastened to the corresponding edges of the plates 13 and 16. Each side plate 17 carries, at a location close to its leading edge and substantially midway between its uppermost and lowermost edges, a corresponding strong and substantially horizontal stub shaft 18, the two stub shafts 18 being substantially horizontally aligned so as to project in opposite directions from the relatively remote surfaces of the two side plates 17. Each substantially horizontal stub shaft 18 has the leading end of a corresponding arm 19 mounted thereon in such a way that said arm 19 is turnable upwardly and downwardly. The arms 19 project generally rearwardly from the stub shafts 18 alongside the corresponding plates 17 and, as can be seen in FIG. 1 of the drawings, both project rearwardly of the hollow frame portion 1 by a considerable distance. Each side plate 17 is formed, close to a bevelled edge interconnecting its rearmost and lowermost edges, with an arcuately curved row of holes 20 which holes are equidistant from the corresponding stub shaft 18. Each arm 19 is also formed with a hole at the same distance from its stub shaft 18 and, as can be seen in FIG. 2 of the drawings, the arms 19 can be releasably secured in desired angular settings about the axis defined by the stub shafts 18 by turning them upwardly or downwardly, as may be required, to bring the holes therein into register with appropriate holes 20. Bolts 21 or other fastenings are then entered through the holes in the arms 19 and the selected holes 20 to maintin the desired angular setting of the arms 19 as long as may be required.

The rearmost ends of the arms 19 carry horizontal bearings between which an open-work cage-formation ground roller 22 is mounted in a freely rotatable manner. The longitudinal axis which is the axis of rotation of the roller 22 is parallel or substantially parallel to a plane containing the axes of rotation of the twelve soil working members 2.

The carrier 12 of each soil working member 2 extends in two opposite directions from its hub and the free ends of its two limbs integrally carry corresponding downwardly projecting sleeve-like holders 23. Each holder 23 is arranged to receive an upper fastening portion of a corresponding flat spring steel tine 24. The two tines 24 of each soil working member 2 are arranged so that they trail downwardly and rearwardly to some extent with respect to the intended direction of operative rotation of the soil working member 2 concerned (see the small arrows in FIGS. 1 and 3 of the drawings) and, preferably, each tine 24 is formed with a plurality of vertically spaced apart holes or notches to enable it to be secured in its holder 23 in different positions of projection from that holder, a clamping pin or other fastening being provided to secure each tine 24 in its selected position of projection from the co-operating holder 23. This arrangement enables the tines 24 to be moved downwardly in their holders 23 to compensate for the inevitable wear of their lower ends to prevent such wear from making it otherwise impossible to adjust the implement to operate at its maximum working depth unless the tines were to be completely replaced.

The uppermost end of each shaft 3 has a corresponding spur gear or straight-toothed pinion 25 welded to it just above the corresponding upper bail bearing 8. The pinions are of such a size, and are so arranged in the hollow frame portion 1, that the teeth of each pinion 25 are in mesh with those of the immediately neighboring pinion 25 and it will be realized that, with this arrangement, each pinion 25, shaft 3 and soil working member 2 will revolve, during the use of the implement, in the opposite direction to the or each immediately neighboring similar assembly. One of the center pair of pinions 25 is provided, immediately thereabove, with a bevel pinion or crown wheel 26 which lies in an appropriately positioned opening formed in the top or cover plate of the hollow frame portion 1. The bevel pinion or crown wheel 26 rotatably surrounds, by way of upper and lower ball bearings 28, the lower end of a non-rotatable shaft 27 that is nevertheless in axial alignment with the shaft 3 that corresponds to said one of the center pair of pinions 25. A major portion of the length of the non-rotatable shaft 27 is received in a downwardly tapering embossed sleeve 31 of a cast gear box 27A, said gearbox 27A having an open bottom and being fastened to the hollow frame portion 1 by some of the small bolts that hold the two parts of that frame portion together, the fastening position of the gearbox 27A being such that its open bottom is in substantial register with the aforementioned opening in the top or cover plate of the hollow frame portion 1 in which the bevel pinion or crown wheel 26 is principally disposed. This arrangement facilitates inexpensive manufacture and easy assembly since a high degree of precision is not required. An internal double shoulder 29 of the hub of the bevel pinion or crown wheel 26 spaces apart the outer races of the upper and lower ball bearings 28, the inner race of the lower ball bearing 28 abutting against a flange 30 formed at the extreme lowermost end of the shaft 27, said flange 30 being spaced by only a very short distance above the top of the corresponding pinion 25 where it is welded to the shaft 3 that is aligned with the non-rotatable shaft 27. The inner race of the upper ball bearing 28 abuts against the flat lowermost end of the cast sleeve 31. The uppermost end of the fixed shaft 27 is of reduced diameter and projects from the mouth of the sleeve 31 in the gearbox 27A, this end of the shaft 27 being recessed to receive a locking ring 32 which prevents downward axial movement of the shaft 27. In the construction of the example being described, the bevel pinion or crown wheel 26 is secured to said one of the pinions 25 by four smooth pins 33 having flanges or heads at their lowermost ends, said pins 33 being entered upwardly through aligned holes in the underlying pinion 25 and overlying bevel pinion or crown wheel 26, the flanges or heads of the pins 33 being countersunk into matchingly shaped recesses formed in the lower surface of the pinion 25. The upper ends of the shanks of the pins 33 project short distances into downwardly tapering recesses formed in the upper surface of the bevel pinion or crown wheel 26 and said pins 33 may be retained in their appointed positions in any one of several different methods. A strong and quick-setting adhesive such as a cyanoacrylate ester or an epoxy resin may be employed or the upper ends of the shanks may be welded into said recesses or known claw couplings or fastenings (not illustrated) may be employed. None of these different possibilities necessitates assembly with a high degree of accuracy.

The bevel pinion or crown wheel 26 has its teeth in driven mesh with those of a smaller bevel pinion 34 carried internally of the gearbox 27A at the inner end of a substantially horizontal rotary input shaft 35 of that gearbox. The input shaft 35 is rotatably mounted in a pair of horizontally spaced apart ball bearings 36 and has a splined or otherwise keyed end which projects forwardly from the front of the gearbox 27A in substantially the direction A. This end of the rotary input shaft 35 is intended to be placed in driven connection with the rear power take-off shaft of an agricultural tractor or other operating vehicle by way of a telescopic transmission shaft 37 (FIG. 1) that is of a construction which is known per se having universal joints at its opposite ends. A blade 38 (FIGS. 3 and 4) is located at one side of the bevel pinion or crown wheel 26 at such a position that it is immediately above the pinions 25 and intersects a vertical plane containing the axes of rotation of all twelve of the rotary soil working members 2. The blade 38 is welded to the leading end of a supporting bracket 39 which bracket is secured to the flat bottom of the hollow frame portion 1 by a pair of bolts 41 and a spacing block 40 or equivalent spacing sleeves. It can be seen in FIG. 3 of the drawings that the blade 38 is inclined to the plane which contains the axes of rotation of all twelve of the soil working members 2 in such a way that the operative bevelled end thereof (see FIG. 4) which is very closely adjacent to the bevel pinion or crown wheel 26 is rearmost relative to the direction A, the straight strip-shaped blade 38 being inclined to the plane which has just been mentioned at an angle which is preferably substantially 30°. The rearmost, with respect to the direction A, bevelled end of the blade 38 is shaped to lie very close indeed to the inverted frusto-conical radially outermost surface of the bevel pinion or crown wheel 26. A second blade 42 is arranged in front of the blade 38 with respect to the direction A and is secured to the substantially flat bottom of the hollow frame portion 1 by a horizontally spaced apart pair of bolts 43. As seen in plan view (FIG. 3), the second blade 42 is of substantially isosceles triangular configuration having one straight side and two concave curved sides, these two curved sides being shaped to match the curvature of the radially outermost cylindrical surface of each of an immediately neighboring pair of two of the pinions 25. The straight base edge, as seen in FIG. 3, of the blade 42 is foremost with respect to the direction A and lies at the front of the inner surface of the substantially flat bottom of the hollow frame portion 1. Approximately the rear half of the blade 42 is inclined upwardly and rearwardly from the part thereof that is secured to the bottom of the frame portion 1 at an angle of substantially 30° to that bottom (see FIG. 4). The rearmost tip of the inclined part of the blade 42 is disposed at a horizontal level which is substantially midway through the vertical thickness of the pinions 25 and is located, considered in the direction A, rearwardly of the leading extremities of the pinions 25 by a distance which is substantially half the radius of one of those pinions 25. The two blades 42 and 38 act to guide oil or other lubricant upwardly from the interior of the hollow frame portion 1 through the opening in the cover plate of that frame portion in which the bevel pinion or crown wheel 26 is primarily located and into the open bottom of the gearbox 27A. This guidance or feed of lubricant into the gearbox 27A is caused because of the disposition of the blades 38 and 42 relative to the directions of rotation (see FIG. 3) of the two pinions 25 (and the bevel pinion or crown wheel 26 which is secured to one of them) that are their immediate neighbors.

A coupling member or trestle 44 which is of approximately arched configuration as seen in front or rear elevation is mounted substantially centrally at the front of the implement where it is secured to the leading upright plate 16. The top of the arched coupling member or trestle 44 is substantially horizontally disposed and in parallel relationship with the transverse length of the hollow frame portion 1, the opposite ends of this top being connected for the purpose of providing additional strength to widely spaced apart locations at the top and rear of the hollow frame portion 1 by downwardly and rearwardly divergent tie beams 45. The center of the top of the coupling member or trestle 44 carries a pair of horizontally spaced apart upright lugs 46 in which at least one pair of horizontally aligned holes is formed. In the use of the implement, which is somewhat diagrammatically illustrated in FIG. 1 of the drawings, a pivot pin mounted in the holes in the lugs 46 turnably connects one end of the upper, adjustable length, lifting links of a three-point lifting device or hitch at the rear of an agricultural tractor or other operating vehicle to the coupling member or trestle 44 of the implement. The coupling member or trestle 44 also comprises substantially horizontally aligned strong pivot pins 47 (FIGS. 1 and 2) near its bottom and these pivot pins 47 are, in the use of the implement (FIG. 1), turnably connected to the free ends of the lower lifting links of the same three-lifting device or hitch.

In the use of the soil cultivating implement that has been described, the coupling member or trestle 44 is employed to connect the implement to the three-point lifting device or hitch at the rear of an agricultural tractor or other propelling and operating vehicle and the known telescopic transmission shaft 37 is employed to place the rear power take-off shaft of the same tractor or other operating vehicle in driving connection with the forwardly projecting end of the rotary input shaft 35 of the gearbox 27A. The maximum depth of penetration of the spring steel or other tines 24 into the ground which is possible during a harrowing operation can, if required, be adjusted, before work commences, by temporarily removing the bolts 21 and turning the ground roller 22 and its arms 19 bodily upwards or downwards, as may be required, about the aligned stub shafts 18 until appropriate fresh holes 20 in the side plates 17 are in register with the holes in the arms 19. The bolts 21 are then replaced and re-tightened.

As the implement moves operatively in the direction A, the tines 24 of the soil working members 2 penetrate into the soil to a controlled depth and each member 2 rapidly revolves about the axis of its shaft 3 in a direction which is opposite to the direction of rotation of the immediately neighboring member 2. It is preferred that each soil working member 2 should have a working width of substantially twenty-five centimeters and that the spacing between the axes of the shaft 3 should be such that the strip of soil worked by each individual member 2 overlaps that worked by its immediate neighbors. However, depending upon legal requirements as to the maximum width of implements which can be transported along roads in various countries, the sizes of the members 2 and the spacing between the shafts 3 can be changed. Also, an implement having twelve soil working members 2 is by no means mandatory and that number can be either increased or decreased which will, of course, again change the effective width of the implement.

The rotary shafts 3 have the same diameter throughout their lengths and therefore do not need expensive machining operations. Moreover, the rotary support of the shafts 3 from the tubes 4 avoids the need for cast bearing housings, each tube 4 preferably having a length, as illustrated, which is substantially the same as the diameter of one of the pinions 25, this diameter again preferably being substantially twenty-five centimeters. In addition to very significantly stiffening and thus strengthening the hollow frame portion 1, the plates 13 and 16 give a good protection against damage by stones and other hard objects that may be met with in the soil when the implement is in use. The tubes 4 are quickly and easily installed in their appointed positions using the flanges 5 in which the screw-threaded holes 6 and 7 are already formed. The pinions 25 are easily welded to the upper ends of the corresponding shafts 3 and, since the bottom of the gearbox 27A is open, it can be formed and assembled in an inexpensive manner. In particular, the non-rotatable shaft 27 having the flange 30 at its lower end can quickly and easily be placed in its appointed position in the sleeve 31 without complicated precautions as to a high degree of precision being necessary. Similarly, the mounting of the bevel pinion or crown wheel 26 on top of one of the pinions 25 is a simple and inexpensive proceeding which does not require a high degree of accuracy, the assembly being particularly quick and easy when the flanged or headed pins 33 are retained in their appointed positions by the use of known claw couplings or fastenings (not shown). Heat generated during the use of the implement is readily conducted from the bevel pinion or crown wheel 26 to the underlying pinion 25 which it contacts throughout a considerable area, the latter pinion being continuously cooled by the oil or other lubricant in which it is at least partly immersed. Lubrication in the gearbox 27A itself is, as previously mentioned, ensured during the use of the implement by the upward deflection of oil or other lubricant from the hollow frame portion 1 by way of the guide blades 42 and 38 which are closely adjacent to two of the pinions 5 and the bevel pinion or crown wheel 26, respectively, said guide blades 42 and 38 being shaped and positioned to co-operate with the rotating pinions, during the use of the implement, in feeding oil or other lubricant upwardly through the opening in the top or cover plate of the hollow frame portion 1 and into the open bottom of the gearbox 27A. The various features which have been described enable this implement to be manufactured and assembled with a considerable saving in cost as compared with comparable known implements due, principally, to the employment of less expensive materials, the reduction of machining to a minimum and to rapid assembly techniques that do not require excessive accuracy.

The soil cultivating implement that has been described also forms the subject of our co-pending patent application Ser. No. 497,552 filed 5/24/83 to which reference is directed.

Although certain features of the soil cultivating implement described and illustrated in the accompanying drawings will be set forth in the following claims as inventive features, it is emphasized that the invention is not necessarily limited to those features and may include within its scope other patentably novel components which have been disclosed both individually and in various combinations.

Having described my invention, what I claim as new and to be secured by Letters Patent of the United States is:

1. An agricultural implement comprising a shaft rotating in bearing means, a rotating tool connected to one end of said shaft, normally outwardly extending means comprising a spur gear rigidly connected to the other end of said shaft, a bevel pinion connected to said outwardly extending means so that its axis of rotation is substantially coincident with the axis of rotation of said shaft, a gearbox for said bevel pinion secured in a fixed position relative to said bearing means, said gearbox holding a further shaft which is substantially aligned with said first mentioned shaft, said bevel pinion having a central bearing which is arranged to receive said further shaft so that said bevel pinion's axis of rotation is determined by said further shaft.

2. An implement as claimed in claim 1, wherein said further shaft is arranged to extend downwardly from un upper region of said gearbox.

3. An implement as claimed in claim 1, wherein one of said blade means is located adjacent the top of said spur pinion and alongside the periphery of said bevel pinion.

4. An implement as claimed in claim 1, wherein said further shaft is arranged in a cast sleeve of said gearbox.

5. An implement as claimed in claim 1, wherein said spur pinion is welded to the upper end of said first-mentioned shaft.

6. An agricultural implement comprising a shaft rotating in bearing means, a rotating tool connected to one end of said shaft, normally outwardly extending means rigidly connected to the other end of said shaft, a bevel pinion connected to said outwardly extending means so that its axis of rotation is substantially coincident with the axis of rotation of said shaft, a gearbox for said bevel pinion secured in a fixed position relative to said bearing means, said gearbox holding a further shaft which is substantially aligned with said first mentioned shaft, said bevel pinion having a central bearing which is arranged to receive said further shaft so that said bevel pinion's axis of rotation is determined by said further shaft, said further shaft being fastened in position only at the top of said gearbox.

7. An implement as claimed in claim 6, wherein said gearbox is located on top of a frame portion of the implement which accommodates a plurality of intermeshing pinions, the bottom of said gearbox being open and communicating through an opening in the top of the hollow frame portion with the interior of that frame portion in which said intermeshing pinions are disposed.

8. An agricultural implement comprising a shaft rotating in bearing means, a rotating tool connected to one end of said shaft, normally outwardly extending means rigidly connected to the other end of said shaft, a bevel pinion connected to said outwardly extending means so that its axis of rotation is substantially coincident with the axis of rotation of said shaft, a gearbox for said bevel pinion secured in a fixed position relative to said bearing means, said gearbox holding a further shaft which is substantially aligned with said first mentioned shaft, said bevel pinion having a central bearing which is arranged to receive said further shaft so that said bevel pinion's axis of rotation is determined by said further shaft, said gearbox being located on top of a frame portion of the implement which accommodates a plurality of intermeshing pinions, the bottom of said gearbox being open and communicating through an opening in the top of the hollow frame portion with the interior of that frame in which said intermeshing pinions are disposed.

9. An implement as claimed in claim 8, wherein blade means are disposed adjacent said bevel pinions which perform the function of guiding lubricant to said bevel pinions when the implement is in use.

10. An implement as claimed in claim 9, wherein one of said blade means is located adjacent the top of said spur pinion and alongside the periphery of said bevel pinion and another of said blade means is located in the region of a plane which is normal to the axis of rotation of said first mentioned shaft and passes through said shaft.

11. An implement as claimed in claim 10, wherein said other blade means is inclined at an angle of substantially 30° to said plane.

12. An implement as claimed in claim 10, wherein said other blade means is inclined rearwardly towards said bevel pinion with respect to the intended direction of forward operative travel of the implement.

13. An implement as claimed in claim 12, wherein said other blade means is inclined rearwardly towards said bevel pinion with respect to the intended direction of forward operative travel of the implement.

14. An implement as claimed in claim 13, wherein the end of said one blade means is shaped so as substantially to match the periphery of said bevel pinion.

15. An implement as claimed in claim 13, wherein said other blade means is arranged in advance of the first-mentioned blade means with respect to the intended direction of forward operative travel of the implement.

16. An implement as claimed in claim 15, wherein said other blade is arranged between said spur pinion and with an immediately neighboring further spur pinion which meshes therewith, said other blade means being generally triangular in shape and having two sides which are concave as seen in plan view and which match the convex peripheries of said spur pinions.

17. An implement as claimed in claim 15, wherein said other blade means has a part which extends upwardly and rearwardly away from a fastening part therefor, said upwardly and rearwardly extending part terminating in a tip which is located at a horizontal level substantially coinciding with that of the middle of the axial thickness of said spur pinion.

18. An implement as claimed in claim 10, wherein the end of said one blade means is shaped so as substantially to correspond to the periphery of said bevel pinion.

19. An implement as claimed in claim 10, wherein said other blade means is arranged forward of the first-mentioned blade means with respect to the intended direction of the implement's forward operative travel.

20. An implement as claimed in claim 19, wherein said other blade means has a part which extends upwardly and rearwardly away from a fastening part therefor, said upwardly and rearwardly extending part terminating in a tip which is located at a horizontal level substantially coinciding with that of the central part of the axial thickness of said spur pinion.

21. An implement as claimed in claim 10, wherein said other blade means is arranged between said spur pinion and with an immediately neighboring further spur pinion which meshes therewith, said other blade means being generally triangular in shape and having two sides which are concave as seen in plan view and which correspond to the convex peripheries of said spur pinions.

* * * * *